United States Patent [19]

Carbon, deceased et al.

[11] Patent Number: 4,803,918
[45] Date of Patent: Feb. 14, 1989

[54] DOUBLE BAKER FOR WAFFLES, PANCAKES AND SIMILAR FOOD ITEMS

[76] Inventors: Fred S. Carbon, deceased, late of Buchanan, Mich.; by Donald A. Carbon, executor, 105 Days Ave., Buchanan, Mich. 49107

[21] Appl. No.: 42,413

[22] Filed: Apr. 24, 1987

Related U.S. Application Data

[63] Continuation-in-part of Ser. No. 825,565, Feb. 3, 1986.

[51] Int. Cl.⁴ .............................................. A47J 37/00
[52] U.S. Cl. ....................................... 99/377; 99/374; 219/524
[58] Field of Search ............. 99/374, 377, 380, 443 R, 99/372; 219/524, 525

[56] References Cited

U.S. PATENT DOCUMENTS 2,116,688  5/1938  Ratliff .
3,999,947  12/1976 Carbon .
4,075,940  2/1978  Carbon .

FOREIGN PATENT DOCUMENTS 839393  7/1949  Fed. Rep. of Germany .

Primary Examiner—Henry J. Recla
Assistant Examiner—Linda J. Sholl
Attorney, Agent, or Firm—James D. Hall

[57] ABSTRACT

A two cavity baker for confectionery items such as waffles and pancakes having a pair of outer shell members hinge-connected to a double faced single inner shell member. The two outer shell members and the inner shell member are mutually hinged together at one side of the baker with the two outer shell members each including a handle protruding from the opposite side of the baker. The three shell members are supported upon a base adjacent the handle and hinged sides of the baker which enables to two outer shell members to be reversed with respect to their upper and lower positions upon pivotal movement about a generally horizontal axis. The pivot connection of the shell members to the base accommodates biaxial rotational movement of the shell members so as to enable the shell members to assume a vertical orientation relative to the base to enable the outer shell members to be opened relative to the inner shell member.

8 Claims, 4 Drawing Sheets

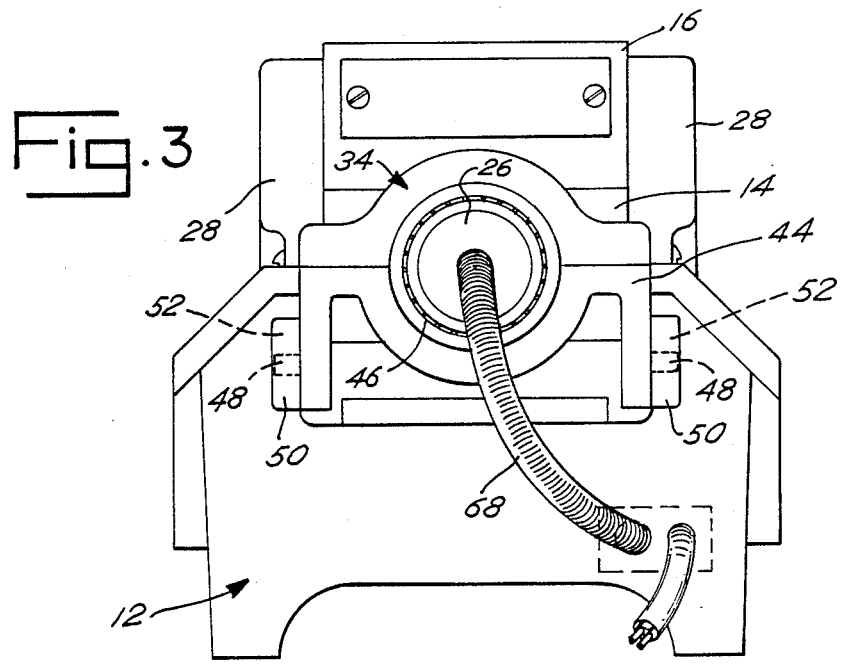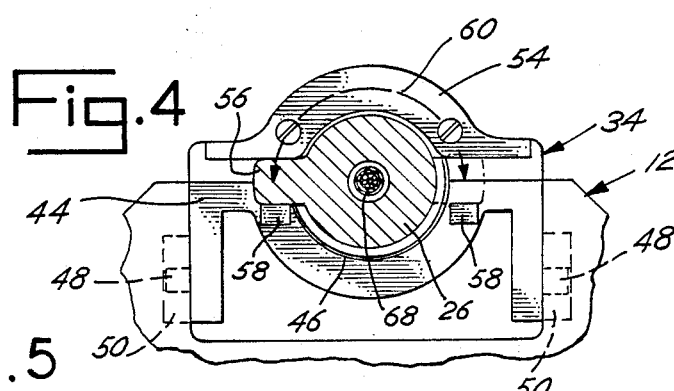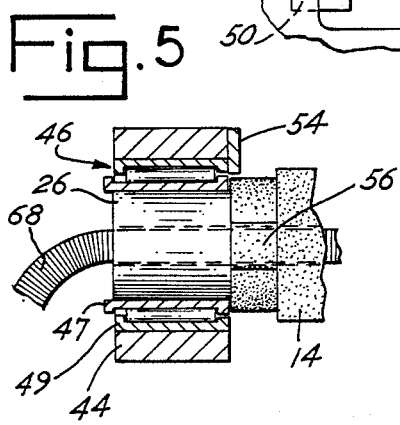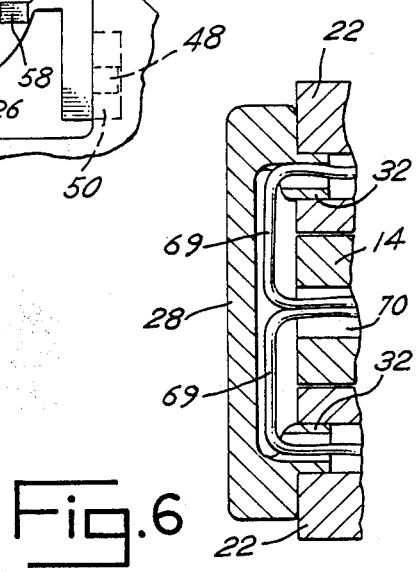

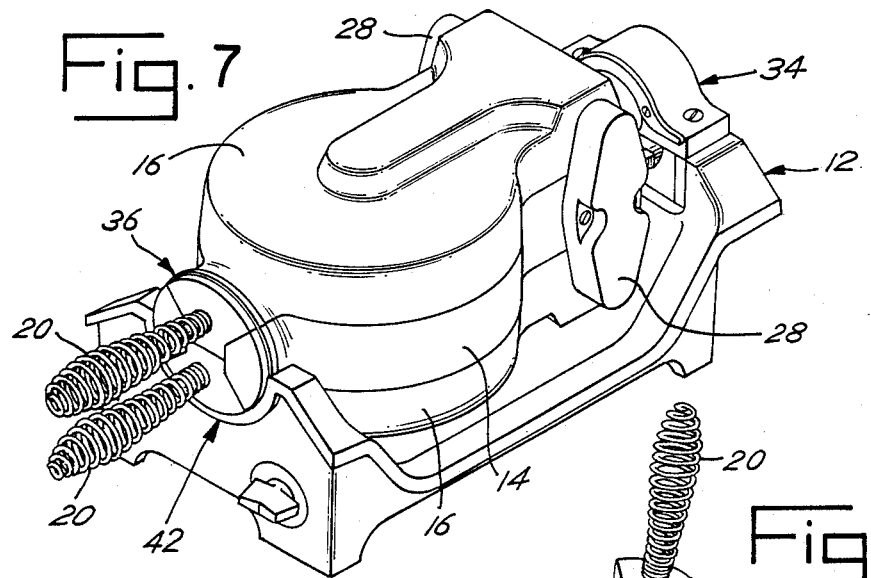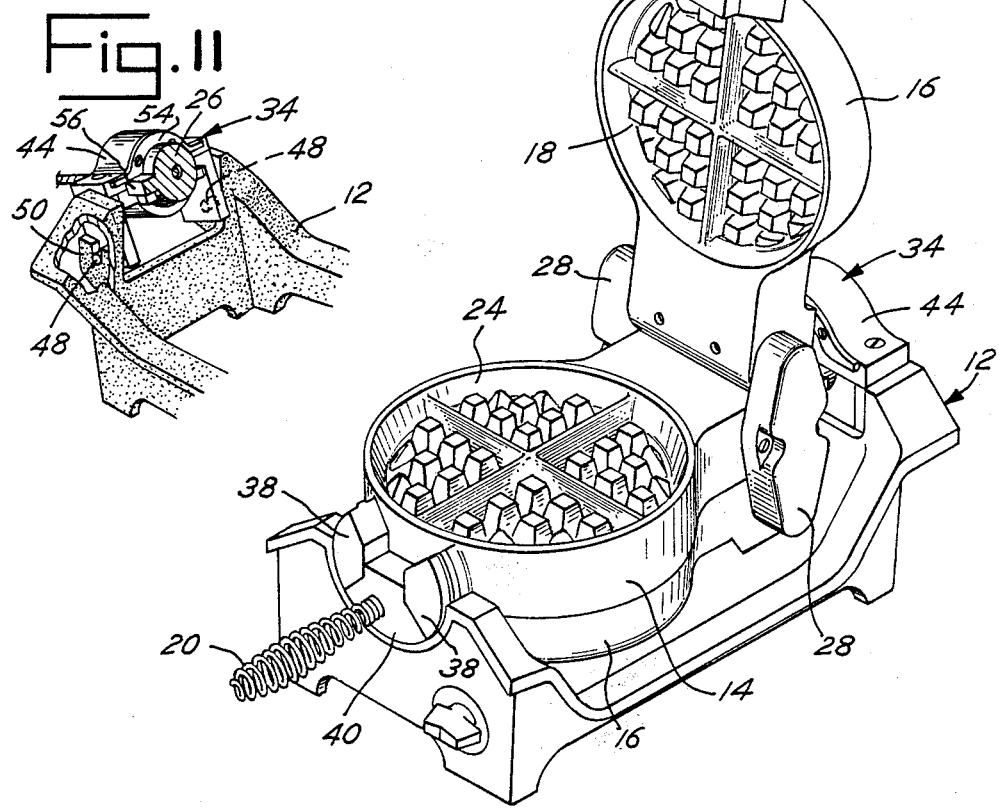

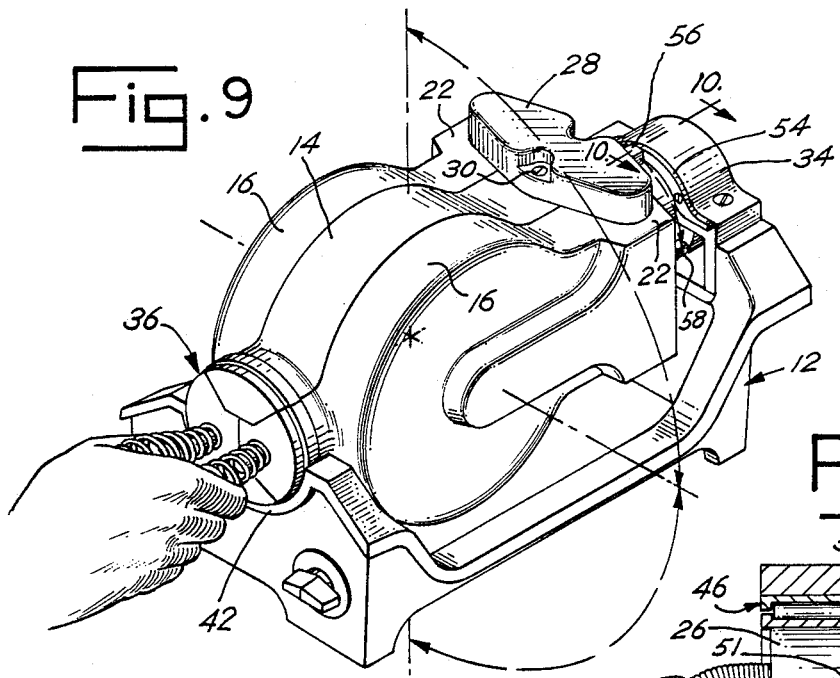
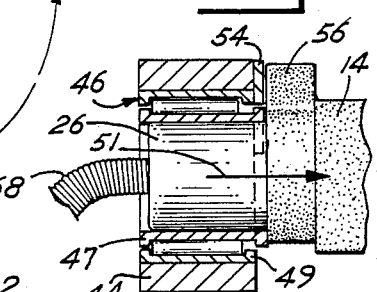
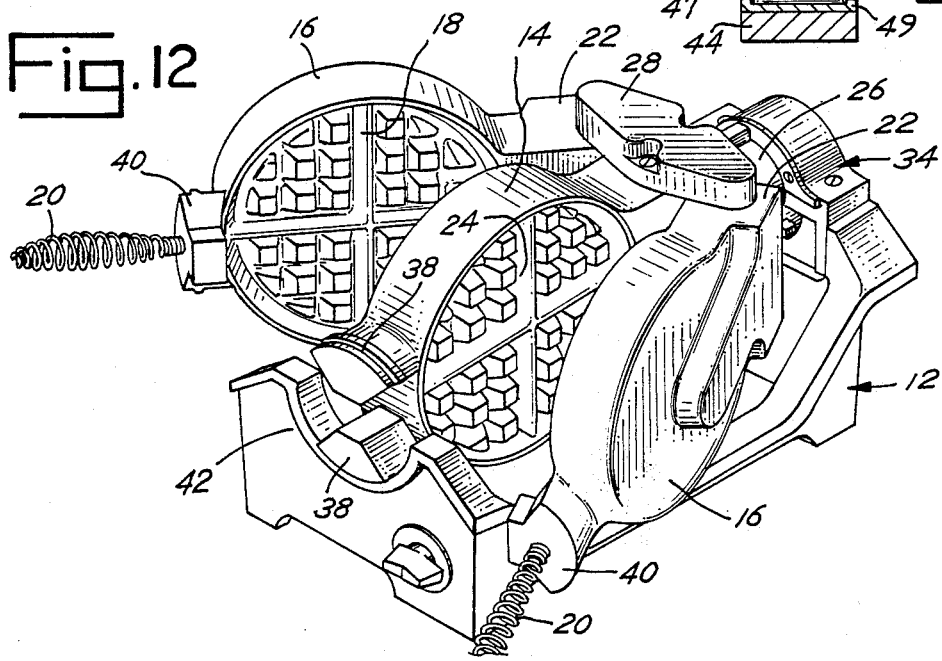

DOUBLE BAKER FOR WAFFLES, PANCAKES AND SIMILAR FOOD ITEMS

CROSS-REFERENCE TO RELATED APPLICATION

This is a continuation-in-part of application Ser. No. 825,565 filed Feb. 3, 1986.

SUMMARY OF THE INVENTION

This invention relates to a baker for food items such as pancakes and waffles and will have application to a baker for cooking two such food items simultaneously.

Waffle and pancake bakers were at one time of the construction with but one upper hinged shell member having the capability of baking but one waffle or pancake at a time. This form of baker was improved upon in U.S. Pat. Nos. 3,999,473 and 4,075,940 in which a pivotal two part shell member baker is disclosed which permits rotation of the shell elements during the cooking process to facilitate even baking of the food item. Even with this improvement, only one such waffle or pancake could be cooked at one time. Therefore, the afore-described bakers were generally utilized in multiple numbers at restaurants and other food establishments to enable a sizable number of such waffles or pancakes to be produced. In U.S. Pat. No. 2,116,688, a double baker is disclosed and described. This type of baker would allow rotative movement of the shell members which in turn would accommodate two pancakes or waffles.

In the following described invention, the baker of U.S. Pat. No. 2,116,688 is improved upon the introduction of combination a slip and pivot connection between the baker shell members and the baker base. This slip and pivot connection acts as a lock for the shell members and also allows the three shell members to be jointly moved in a lateral direction relative to the base and then tilted and fully opened to permit ease of cleaning and cooling of the baker. Additionally, the wiring to the heating elements in the outer shell members extend through the pivot connections of the outer shell members to the inner shell member so as to minimize wear and breakage of the electrical wiring during use of the baker. In the following described invention, the baker has been modified and improved upon so as to provide a sturdy but compact baker suitable for long periods of extended use in restaurants and other food establishments.

Accordingly, it is an object of this invention to provide a multiple cavity food baker, such as for pancakes and waffles, of efficient and simplified operation.

Another object of this invention is to provide a double waffle or pancake baker of reliable operation.

Still another object of this invention is to provide a double food baker such as for waffles and pancakes and which may be cleaned and maintained in a simplified manner.

Other objects of this invention will become apparent upon a reading of the following description.

Brief Description of the Drawings

A preferred embodiment of this invention has been chosen for purposes of illustration and description wherein:

FIG. 3 is a rear end elevational view of the baker;

FIG. 4 is a fragmentary sectional view taken along line 4—4 of FIG. 2;

FIG. 5 is a fragmentary longitudinal sectional view taken along line 5—5 of FIG. 1;

FIG. 6 is a fragmentary cross section view taken along line 6—6 of FIG. 2;

FIG. 7 is a pictorial view of the baker with the shell members thereof in their respective closed positions;

FIG. 8 is a perspective view of the baker showing the upper most outer shell member in its open position;

FIG. 9 is a perspective view showing the baker shell members being rotated into a vertical orientation;

FIG. 10 is a fragmentary sectional view taken along line 10—10 of FIG. 9.

FIG. 11 is a fragmentary perspective view of the base with its bearing block in a raised position.

FIG. 12 is a perspective view showing the outer shell members of the baker being separated while in the their vertical orientation;

DESCRIPTION OF THE PREFERRED EMBODIMENT

Figure 1:
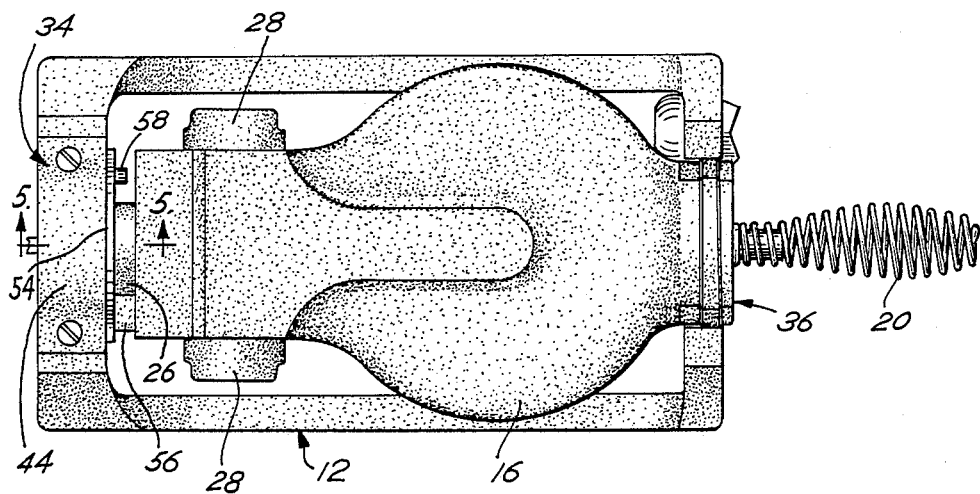
FIG. 1 is a top plan view of the baker.
Figure 2:
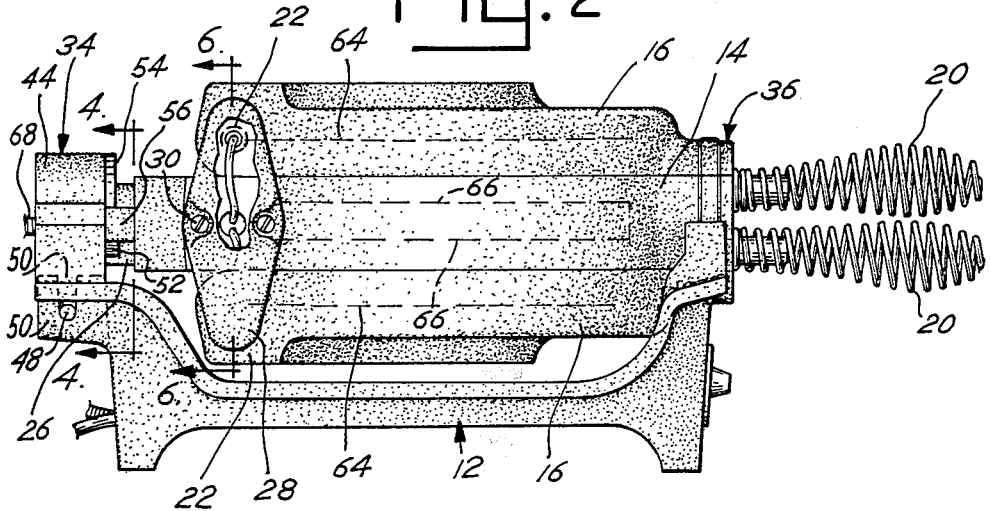
FIG. 2 is a side elevational view of the baker with portions broken away for purposes of illustration.

The preferred embodiment illustrated is not intended to be exhaustive or to limit the invention to the precise form disclosed. It is chosen and described in order to best describe the principles of the invention and it application and practical use to thereby enable others skilled in the art to best utilize the invention.

Baker 10 includes a base 12 which supports an inner shell member 14 and outer shell members 16. Each outer shell member 16 includes a concave food receiving part 18, a handle 20 and a hinge part 22. Inner shell member 14 includes opposite food receiving parts 24 and a trunnion 26. Inner shell member 14 includes a pair of hinge covers 28 which are connected by screws 30 to the body of the inner shell member adjacent trunnion 26. Each hinge cover 28 includes a pair of protruding pintels 32 which extend into a hinge part 22 of the outer shell member 16 as shown in FIG. 6 to allow each outer shell member 16 to pivot between a closed position such as shown in FIG. 7 and an open position as shown in FIG. 8. In this manner, each of the outer shell members 16 can pivoted about pinels 32 of the inner shell member hinge cover 28 between a closed position in which the food receiving parts 18 and 24 of the shell members are opposed for the baking of the food item and an open position in which the outer shell member is pivoted or swung away from the inner shell member in order to expose the food receiving parts of the shell members to either remove the cooked or baked food item or to place the uncooked food item within the shell members.

The hinged-connected shell members 14 and 16 are supported upon base 12 by trunnion 26 of the inner shell member 14 at the rear cradle part 34 of the base and by a forward composite trunnion 36 which is formed by spaced opposed parts 38 of inner shell member 14 and handle carrying parts 40 of outer shell members 16. Composite trunnion 36 rests within the forward cradle part 42 of base 12 so as to permit the attached shell members 14 and 16 to be rotated as a unit through 180° about a generally horizontal longitudinal axis during the cooking operation.

Rear cradle part 34 of base 12 is of a unique design allowing bi-rotational movement of shell members 14 and 16 as a unit about two axes relative to the base. Rear cradle part 34 includes a bearing block 44 which encloses a roller bearing 46 and which includes oppositely extending pivot pins 48. Base 12 includes rearwardly extending, laterally-spaced tabs 50 each having a vertically oriented slot 52. Bearing block 44 is fitted between tabs 50 with its pivot pins 48 journalled within slots 52 of the tabs so as to permit the bearing block and its roller bearing to pivot relative to the remainder of base 12 about a generally horizontal axis transversely disposed relative to the base. For ease of construction, bearing block 44 is of a two piece construction so as to enable the placement of bearing 46.

A stop plate 54 is mounted across the front upper edge of bearing block 44. Trunnion 26 of inner shell member 14 is fitted within roller bearing 46 and includes a radially extending stop part 56 which is located adjacently in front of the bearing block and normally under stop plate 54. Bearing block 44 also includes a pair of forwardly projecting oppositely spaced locating tabs 58 which are positioned one on each side of roller bearing 46 and below stop plate 54 a distance generally equal to the thickness of inner shell member stop part 56. With inner shell member trunnion 26 journalled within roller bearing 46 so as to utilize the bearing for rotational movement of the shell members, the inner race 47 of bearing 46 is slightly shiftable relative to outer race 49 of the bearing so as to permit a slight longitudinal movement of inner shell member 14 relative to base 12 and its bearing block 44. This movement of inner shell member 14 allows its stop part 56 to be moved forwardly in the direction of arrow 51 until it clears the horizontal plane of stop plate 54 as shown in FIG. 10 which allows the inner shell member and its hinge-corrected outer shell members 16 to be rotated as unit relative to base 12 with the forward composite trunnion 36 of the baker remaining cradled in front cradle part 42 of the base.

Inner shell member 14 does not move longitudinally forward far enough to prevent its stop part 56 from contracting locating tabs 58 of the bearing block so that upon 180° rotation of the shell members 14 and 16 by the grasping of handles 20, as illustrated in FIG. 9, the stop part will contact the opposite locating tabe 58 as shown by broken lines 60 in FIG. 4. This movement of the shell members now places the previous lowermost shell member 16 in the uppermost position while moving the former uppermost shell member 16 into now the lowermost position through 180° movement as illustrated by arrow 60 in FIG. 4. In the following manner, locating tabs 58 and stop part 56 cooperate to limit the rotational movement of the shell members during the baking operation. Once the stop part 56 is repositioned against a selected locating tab 58, the shell members as a unit are pushed rearwardly causing bearing inner race 47 to move relative to outer race 49 to cause the stop part, as seen in FIGS. 4 and 5, to slide adjacently under stop plate 54 which serves to restrict and to prevent rotative movement of the shell members relative to the base during the cooking operation. While in this locked position, the uppermost outer shell member 16 can be shifted by its handle 20 into its open position as illustrated in FIG. 8. When it is desired to cool the shell members after the baking operation or to permit the shell members to drain and dry during or after washing or cleaning, the user need only grasp handles 20 of the outer shell members 16 and pull the inner shell member 14 into its outer longitudinal position as seen in FIG. 10 so as to free the inner shell member stop part 56 from stop plate 54 of the base bearing block 44. The shell members, as a unit, are then rotated 90° into a vertical orientation as seen in FIG. 9. The shell members 14 and 16 as a unit through the grasping of handles 20 are then tilted upwardly causing bearing block 44 to pivot relative to the remainder of base 12 as illustrated in FIG. 11. The shell members 14 and 16 are raised sufficiently to permit the outer shell members 16 to be spread outwardly without interference from forward cradle part 42 of the base. The shell members as a unit are then permitted to pivot downwardly until one of the inner shell member trunnion parts 38 is supported within the front cradle part as illustrated in FIG. 12. While in this position, the baker can cool or the shell members may be permitted to dry or even be cleaned. When it is desired to utilize the baker again, the two handles 20 of the outer shell members 16 are grasped and the shell members raised as a unit causing bearing block 44 to pivot upwardly again relative to its base 12. The outer shell members are then closed and rotated 90° as a closed unit until one of the outer shell member trunnion parts 40 is aligned with cradle part 42 of the base, at which time, the shell members are lowered as a unit until they are supported by the front cradle part. The shell members are then shifted slightly rearwardly relative to base 12 to cause stop part 56 of the inner shell member to be positioned restrictively between a locating tab 58 and stop plate 54 as previously described.

Each of the outer shell members 16 include an electrical heating coil 64 located along its food receiving part 24. Additionally, inner shell member 14 includes, preferably, two heating coils 66 each positioned along a food receiving part 18 of the shell member. In some constructions of this invention a single heating coil may be sufficient to accommodate heating of the inner shell member. An electrical power cord 68 extends from the rear of the baker forwardly through trunnion 26 of inner shell member 14 with its wiring 69 extending laterally through an opening 70 in the trunnion into the cavity formed in the interior side of each hinge cover 28. The wiring 69 then continues through pintels 32 of each hinge cover 28 into the respective outer shell members 16 where they are connected to heating coils 64. Wiring 69 is also connected, as extends through inner shell member trunnion 26, to heating coils 66 within the inner shell member 14 in a manner to complete the electrical circuit. By introducing the power cord wiring into the outer shell members 16 through the pintels 32 of hinge cover 28, the outer shell members may be pivoted relative to the inner shell member without detrimental twisting or breakage of the power cord or its wiring. Each outer shell member 16 is restricted in its opening movement by its engagement in its full open pivoted position with the inner shell member 14 near the hinge parts 22 of the outer shell members. If desired, the form and construction of the outer shell members can be varied so as to permit them to rest against bearing block 44 of base 18 as an opening stop if desired.

It is to be understood the invention is not to be limited to the details above given but may be modified with the scope of the appended claims.

What is claimed is:

1. In a baker for waffles, pancakes and similar food items, said baker including said first and second outer shell members each having a hinge part and a handle part and a concave food receiving part, an inner shell member having a hinge part and oppositely located concave food receiving parts, said inner shell member positioned between said outer shell members with hinge elements interconnecting said shell member hinge parts to enable each outer shell member to be pivoted about said hinge parts relative to the inner shell member between a closed position overlying the inner shell member with the concave food receiving part of the outer shell member overlying a said concave food receiving part of the inner shell member and an open position spaced from the inner shell member, heating element means in at least one of said shell members for baking food items held in overlying concave food receiving parts when the outer shell member thereof is in its closed position, a base cradling said shell members for rotation about a generally horizontal axis with the outer shell members in their closed positions, said base constituting means for supporting said inner shell member and an outer shell member in its closed position with the other outer shell member in its open position, the improvement wherein said inner shell member includes means for supporting both ends thereof by said base independently of said outer shell members to allow the outer shell members to be both simultaneously placed in their open positions.

2. The baker of claim 1 and including a stop means carried by one of said shell members engageable with an engagement component of said base for limiting movement of said shell members about said horizontal axis to position a selected one of said outer shell members in an upper location relative to the other of said outer shell members, said inner shell member including a trunnion means journalled in said base to accommodate its said rotation about said horizontal axis, said trunnion means being shiftable axially relative to the base into an extended position for disengaging said stop means from said base engagement component to allow said shell members to be rotated about said horizontal axis.

3. The baker of claim 2 wherein said stop means is carried by said inner shell member.

4. The baker of claim 2 wherein said inner shell member hinge parts are adjacent said trunnion means.

5. The baker of claim 4 wherein each hinge element includes a cover secured to said inner shell member and having spaced pintel parts each pivotally connected to a said outer shell member hinge part.

6. The baker of claim 5 wherein each outer shell member includes a said heating element means, and electrical wiring means for conducting a current from a power source to said heating element means, said wiring means extending generally axially through said trunnion means and under a said cover and through said pintel parts of the cover into each outer shell member to its said heating element means.

7. The baker of claim 2 wherein said trunnion means is pivotally connected to said base for rotation about an axis transverse to said horizontal axis of rotation of said shell members.

8. The baker of claim 7 wherein said trunnion means is for allowing pivotal movement of said shell members about said second mentioned axis to allow both said outer shell members to be placed in their open positions and thereafter for permitting said inner shell member to be lowered about said second mentioned axis into cradling engagement with said base.

* * * * *